US012505967B2

(12) United States Patent
Murata

(10) Patent No.: US 12,505,967 B2
(45) Date of Patent: Dec. 23, 2025

(54) ELECTROMAGNETIC RELAY WITH DECREASING HOLD POWER REQUIREMENT

(71) Applicant: OMRON Corporation, Kyoto (JP)

(72) Inventor: Keisuke Murata, Kyoto (JP)

(73) Assignee: OMRON CORPORATION, Kyoto (JP)

(*) Notice: Subject to any disclaimer, the term of this patent is extended or adjusted under 35 U.S.C. 154(b) by 206 days.

(21) Appl. No.: 18/341,774

(22) Filed: Jun. 27, 2023

(65) Prior Publication Data

US 2024/0038471 A1 Feb. 1, 2024

(30) Foreign Application Priority Data

Jul. 28, 2022 (JP) ................................ 2022-120735

(51) Int. Cl.

*H01H 50/44* (2006.01)
*H01H 50/18* (2006.01)
*H01H 50/64* (2006.01)

(52) U.S. Cl.

CPC .......... *H01H 50/443* (2013.01); *H01H 50/18* (2013.01); *H01H 50/64* (2013.01)

(58) Field of Classification Search

CPC ...... H01H 50/443; H01H 50/18; H01H 50/64; H01H 47/08; H01F 27/24; H01F 27/28; H01F 27/40

USPC .......................................................... 361/160

See application file for complete search history.

(56) References Cited

U.S. PATENT DOCUMENTS 5,204,647 A * 4/1993 Mitsuki ................ H01H 50/642 335/131
5,363,270 A * 11/1994 Wahba .................. H01F 7/1811 361/194
2020/0411267 A1* 12/2020 Shimoda ................ H01H 47/22

FOREIGN PATENT DOCUMENTS

CN 203118872 U * 8/2013
FR 2006888 A1 * 1/1970
JP 2009-158159 A 7/2009
WO WO-2018121614 A1 * 7/2018 ............... H01F 7/18

OTHER PUBLICATIONS

A. Rahimi, Ö. Zorlu, A. Muhtaroglu and H. Kulah, "Fully Self-Powered Electromagnetic Energy Harvesting System With Highly Efficient Dual Rail Output," in IEEE Sensors Journal, vol. 12, No. 6, pp. 2287-2298, Jun. 2012 (Year: 2012).*

(Continued)

*Primary Examiner* — Sreeya Sreevatsa

(74) *Attorney, Agent, or Firm* — SHINJYU GLOBAL IP

(57) ABSTRACT

An electromagnet device includes an electromagnetic coil and a capacitor. The electromagnetic coil includes a first coil and a second coil connected in parallel to the first coil. The capacitor is connected to the second coil and configured to be charged by a voltage applied to the electromagnetic coil. Upon application of the voltage to the electromagnetic coil, the first coil and the second coil are turned from a non-conducting state to a conducting state. Upon completion of a charging of the capacitor by the application of the voltage to the electromagnetic coil, a current flow into the second coil will have ceased, and the second coil will have changed from the conducting state into the non-conducting state.

11 Claims, 7 Drawing Sheets

(56) References Cited

OTHER PUBLICATIONS

Rahimi (A. Rahimi, Ö. Zorlu, A. Muhtaroglu and H. Kulah, "Fully Self-Powered Electromagnetic Energy Harvesting System With Highly Efficient Dual Rail Output," in IEEE Sensors Journal, vol. 12, No. 6, pp. 2287-2298, Jun. 2012) (Year: 2012).*

* cited by examiner

ELECTROMAGNETIC RELAY WITH DECREASING HOLD POWER REQUIREMENT

CROSS-REFERENCE TO RELATED APPLICATION

This application claims priority to Japanese Patent Application No. 2022-120735, filed Jul. 28, 2022. The contents of that application are incorporated by reference herein in their entirety.

FIELD

This invention relates to electromagnet devices.

BACKGROUND

A control circuit of an electromagnet device in which a contact device is driven by electromagnetic force is known. The control circuit applies a voltage to an electromagnetic coil to operate the contact device and switches the operating voltage to a holding voltage, as disclosed in Japanese Patent Application Publication No. 2009-158159 for example. This configuration leads to reduction in power consumption and temperature rise of the electromagnet device.

The control circuit according to Japanese Patent Application Publication No. 2009-158159 uses an auxiliary contact mechanically interlocked with a main contact and a semiconductor switching element, and switches the voltage applied to the electromagnetic coil from that for operation to that for holding on the condition that the auxiliary contact enters a closed state from an open state. This operation system makes the configuration of the control circuit complex and increases the installation space and cost of the control circuit.

SUMMARY

Devices according to the claimed invention provide an electromagnet device configured to change the voltage applied to an electromagnetic coil from an operating voltage to a holding voltage with a simple configuration.

An electromagnet device according to one aspect of the claimed invention is configured to drive a contact device by electromagnetic force. The electromagnet device includes an electromagnetic coil and a capacitor. The electromagnetic coil includes a first coil and a second coil connected in parallel to the first coil. The capacitor is connected to the second coil and is configured to be charged by application of a voltage to the electromagnetic coil. The first coil and the second coil are turned from a non-conducting state to a conducting state by the application of the voltage to the electromagnetic coil. Upon completion of charging of the capacitor by the application of the voltage to the electromagnetic coil, a current flow into the second coil ceases, and the second coil changes from the conducting state to the non-conducting state.

In the present electromagnet device, the second coil is connected in parallel with the first coil, and when the capacitor is charged completely by the application of the voltage to the electromagnetic coil, the second coil will have changed from a conducting state to a non-conducting state. In other words, the first and second coils are maintained in the conducting state until the charging of the capacitor is completed after the application of the voltage to the electromagnetic coil starts. After the capacitor charge is completed, the first coil remains in the conducting state and the second coil will have changed into the non-conducting state by the capacitor. This means that, for example, if the power consumption of the first coil is set based on a holding voltage, the voltage applied to the electromagnetic coil will have changed to the holding voltage after the completion of capacitor charging. As a result, the voltage applied to the electromagnetic coil can be changed from the operating voltage to that for holding with a simple configuration.

During the application of the voltage to the electromagnetic coil, the time required for a contact unit of the contact device to switch from an OFF state to an ON state may be shorter than a time required for the capacitor to be completely charged. In this case, the second coil is less likely to become non-conductive before the contact unit of the contact device has switched from the OFF state to the ON state. That is, the electromagnetic force is less likely to be decreased during the operation of the contact unit.

The capacitor may be configured to become completely charged after the contact unit of the contact device has switched from the OFF state to the ON state by the application of the voltage to the electromagnetic coil. In this case, the second coil is less likely to become non-conductive before the contact unit of the contact device is switched from the OFF state to the ON state. That is, the electromagnetic force is less likely to be decreased during the operation of the contact unit.

The electromagnet device may further include a first coil terminal connected to the first coil and an anode of an external power supply, a second coil terminal connected to a cathode of the external power supply, and a third coil terminal having a second receiving portion. The first coil terminal may have a first receiving portion. The capacitor may include a first terminal inserted in the first receiving portion and a second terminal inserted in the second receiving portion. In this case, the connection between the first coil terminal to the capacitor and the connection between the third coil terminal to the capacitor are facilitated.

The electromagnet device may further include a diode including a cathode terminal inserted in the first receiving portion and an anode terminal inserted in the second receiving portion. In this case, the electromagnet device can be protected from reverse voltage. In addition, the connection between the first coil terminal and the diode and the connection between the third coil terminal and the diode are facilitated.

The capacitor and the diode may be externally attached to the first coil terminal and the third coil terminal. In this case, for example, the claimed invention can be easily implemented in an existing electromagnet device that is equipped with three coil terminals. The claimed invention can also be easily implemented in an electromagnetic relay in which a space for the capacitor and the diode is hardly secured inside the case where the electromagnet device is housed.

DETAILED DESCRIPTION

Figure 1:
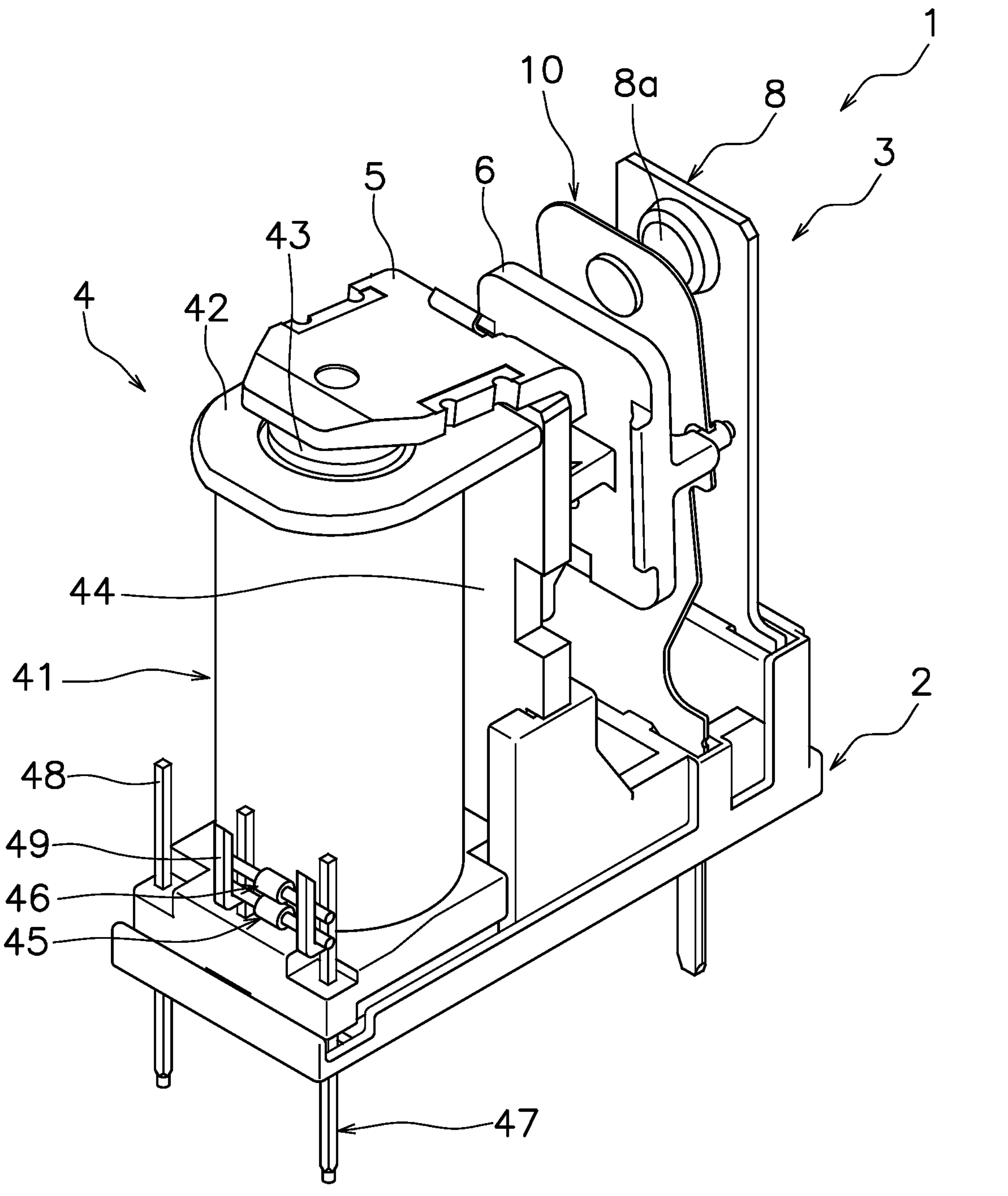
FIG. 1 is a perspective diagram of an electromagnetic relay.

An embodiment of an electromagnetic relay equipped with an electromagnet device according to one aspect of the present invention will be described below with reference to the drawings.

As shown in FIGS. 1 to 4, an electromagnetic relay 1 includes a base 2, a contact device 3, an electromagnet device 4, a movable iron piece 5, and a card 6.

Figure 2:
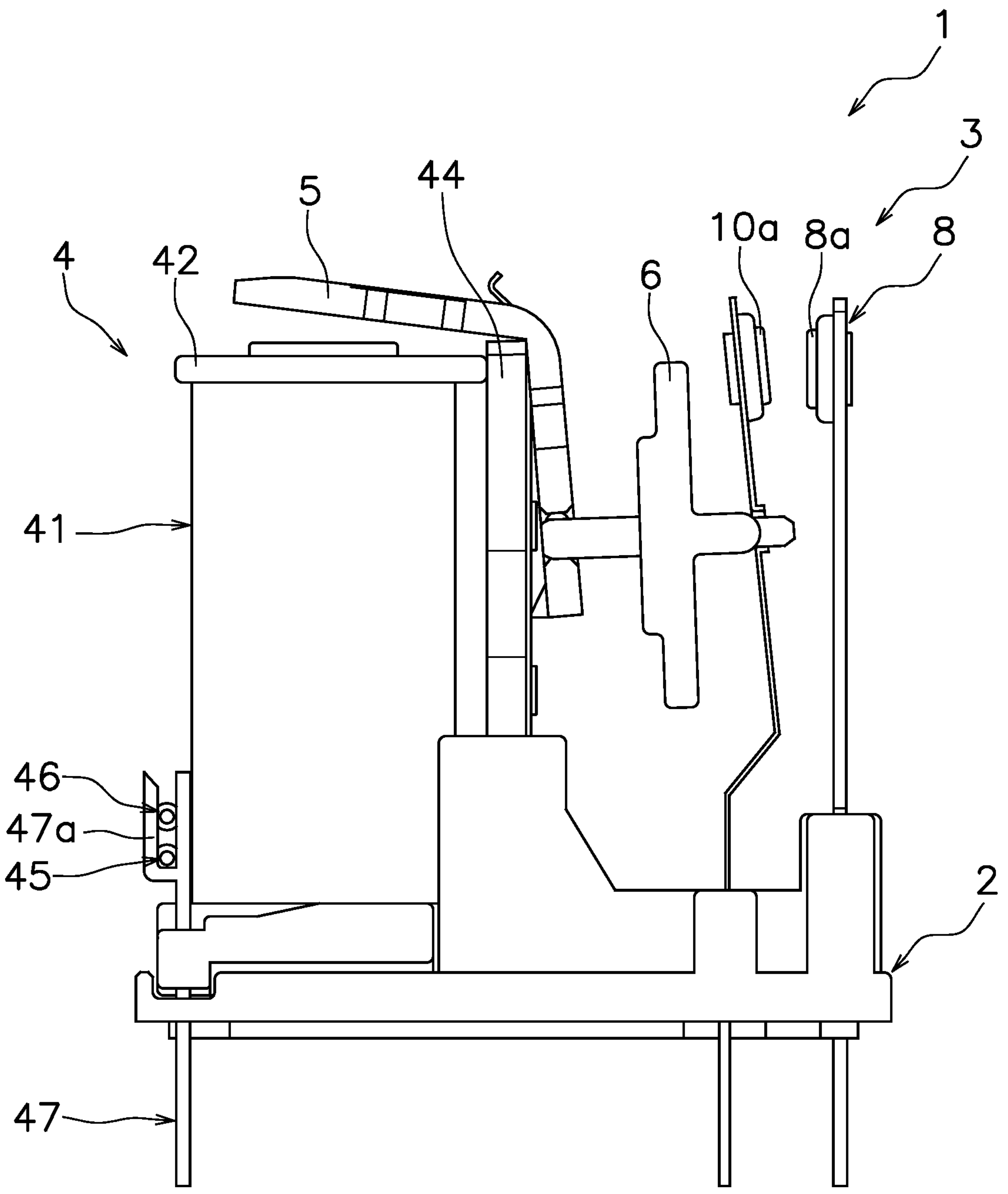
FIG. 2 is a side view of an electromagnetic relay.

In the following description, the direction in which the contact device 3 and the electromagnet device 4 are arranged with respect to the base 2 is defined as upward, and the opposite direction is defined as downward. The direction in which the contact device 3 is arranged with respect to the electromagnet device 4 is defined as forward, and the opposite direction is defined as rearward. The direction perpendicular to the plane of FIG. 2 is defined as a left-right direction. These directions are defined for convenience of description, and are not to limit the arrangement directions of the electromagnetic relay 1.

The base 2 may be comprised of an insulating material such as resin. The base 2 extends in the front-rear direction and the left-right direction. Note that the electromagnetic relay 1 includes a case (not shown) covering the base 2 from above.

The contact device 3 is arranged on the base 2. The contact device 3 is supported by the base 2. The contact device 3 includes a fixed terminal 8 and a movable contact piece 10. The fixed terminal 8 and the movable contact piece 10 are comprised of a conductive material.

The fixed terminal 8 is supported by the base 2. The fixed terminal 8 extends through the base 2 in the up-down direction. The fixed terminal 8 includes a fixed contact 8*a*. The fixed contact 8*a* is arranged on the rear surface of the fixed terminal 8.

The movable contact piece 10 is arranged behind the fixed terminal 8. The movable contact piece 10 is supported by the base 2. The movable contact piece 10 extends through the base 2 in the up-down direction. The movable contact piece 10 includes a movable contact 10*a*. The movable contact 10*a* is arranged to face the fixed contact 8*a* in the front-rear direction, and is configured to come into contact with the fixed contact 8*a*.

The electromagnet device 4 drives the contact device 3 with electromagnetic force. The electromagnet device 4 moves the card 6 via the movable iron piece 5. The electromagnet device 4 is disposed on the base 2. The electromagnet device 4 is supported by the base 2. The electromagnet device 4 includes an electromagnetic coil 41, a spool 42, an iron core 43, and a yoke 44.

The electromagnetic coil 41 is wound around the outer circumference of the spool 42. Note that in FIGS. 1 to 4, winding of the electromagnetic coil 41 is not illustrated. A voltage is applied to the electromagnetic coil 41 from a DC power supply 50. The DC power supply 50 is an example of an external power supply.

Figure 5:
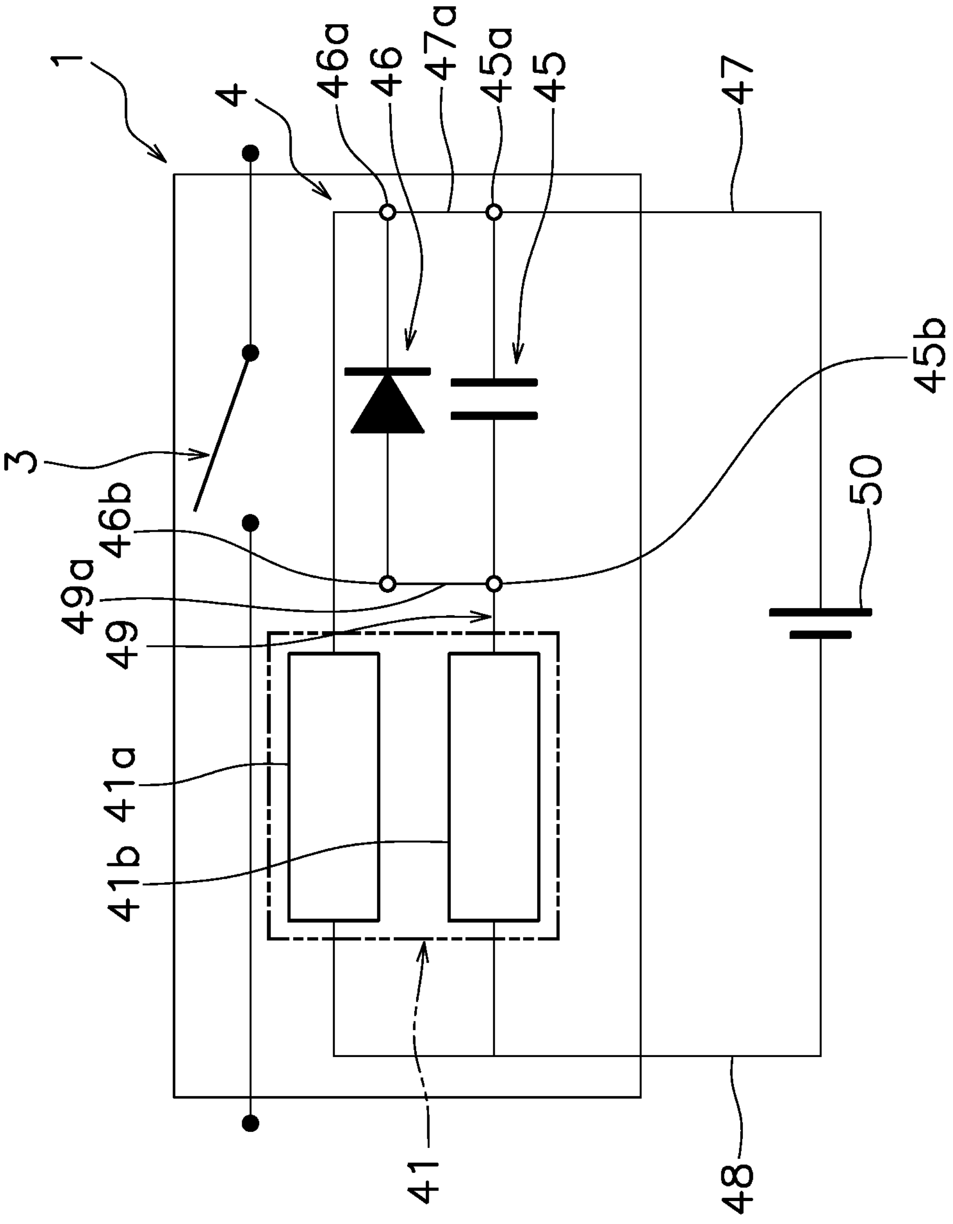
FIG. 5 is a schematic circuit diagram of an electromagnet device.

As shown in FIG. 5, the electromagnetic coil 41 includes a first coil 41*a* and a second coil 41*b*. The second coil 41*b* is connected in parallel with the first coil 41*a*. Upon application of a voltage to the electromagnetic coil 41, the first coil 41*a* and the second coil 41*b* are switched from the non-conducting state to the conducting state.

The iron core 43 is arranged on the inner circumference of the spool 42. The iron core 43 has an upper end that is a magnetic pole surface arranged to face the movable iron piece 5 in the front-rear direction.

The yoke 44 is arranged around the electromagnetic coil 41. The yoke 44 is L-shaped. The yoke 44 is disposed below the electromagnetic coil 41 and in front of the electromagnetic coil 41. The yoke 44 is connected to the lower end of the iron core 43.

The movable iron piece 5 is disposed between the electromagnet device 4 and the card 6. The movable iron piece 5 is L-shaped. The movable iron piece 5 is coupled to the card 6. The movable iron piece 5 has a rear end arranged above the iron core 43. The movable iron piece 5 is pivotally supported by a hinge spring. The movable iron piece 5 rotates about the upper end of the yoke 44 as a rotation fulcrum. The movable iron piece 5 has a rear end that is urged away from the iron core 43 by the hinge spring.

The card 6 is comprised of an insulating material such as resin. The card 6 moves forward and backward as the movable iron piece 5 pivots.

Next, the operation of the electromagnetic relay 1 is described. While the electromagnetic coil 41 is not energized, the movable contact 10*a* is separated from the fixed contact 8*a*. Upon application of a voltage to the electromagnetic coil 41 to excite it, the movable iron piece 5 is attracted to the iron core 43 and pivots. As the movable iron piece 5 pivots, the card 6 is pressed by the movable iron piece 5 and moves forward. As a result, the card 6 pushes the movable contact piece 10 forward, causing the movable contact 10*a* to contact the fixed contact 8*a*.

In response to stopping of the voltage application to the electromagnetic coil 41, the movable contact piece 10 and the elastic force of the hinge spring cause the movable iron piece 5 to pivot away from the iron core 43. As a result, the card 6 moves rearward, separating the movable contact 10*a* from the fixed contact 8*a*.

Figure 3:
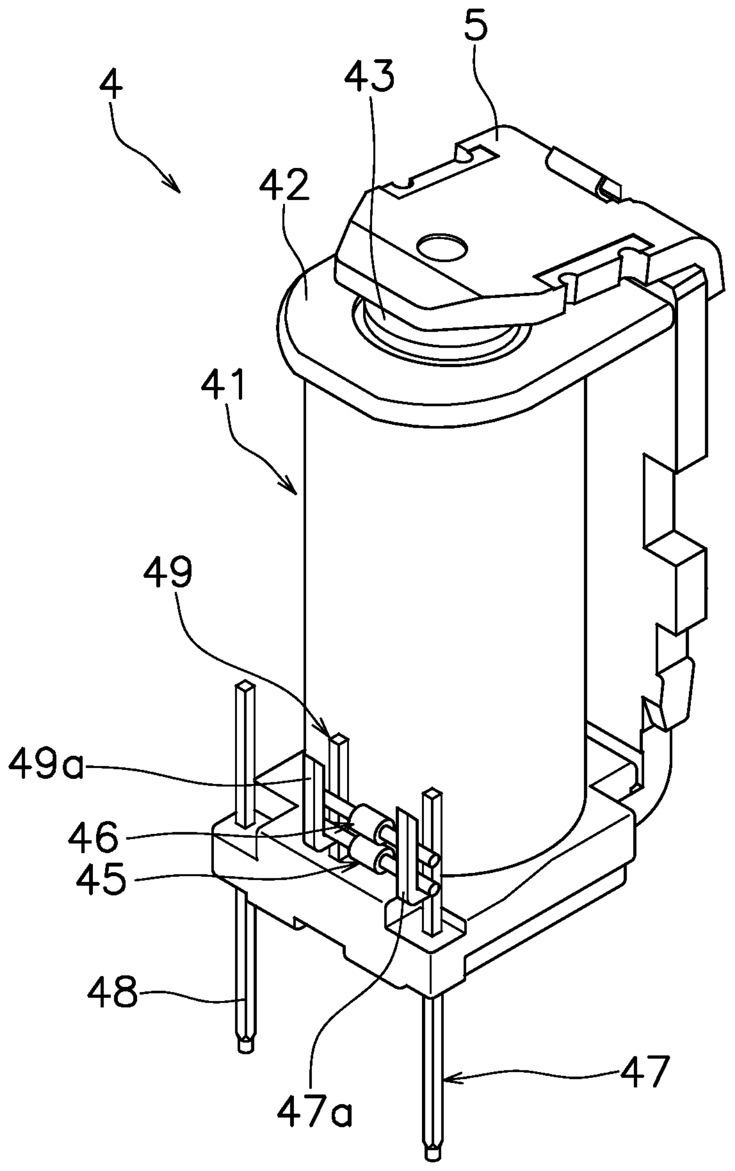
FIG. 3 is a perspective diagram of an electromagnet device.
Figure 4:
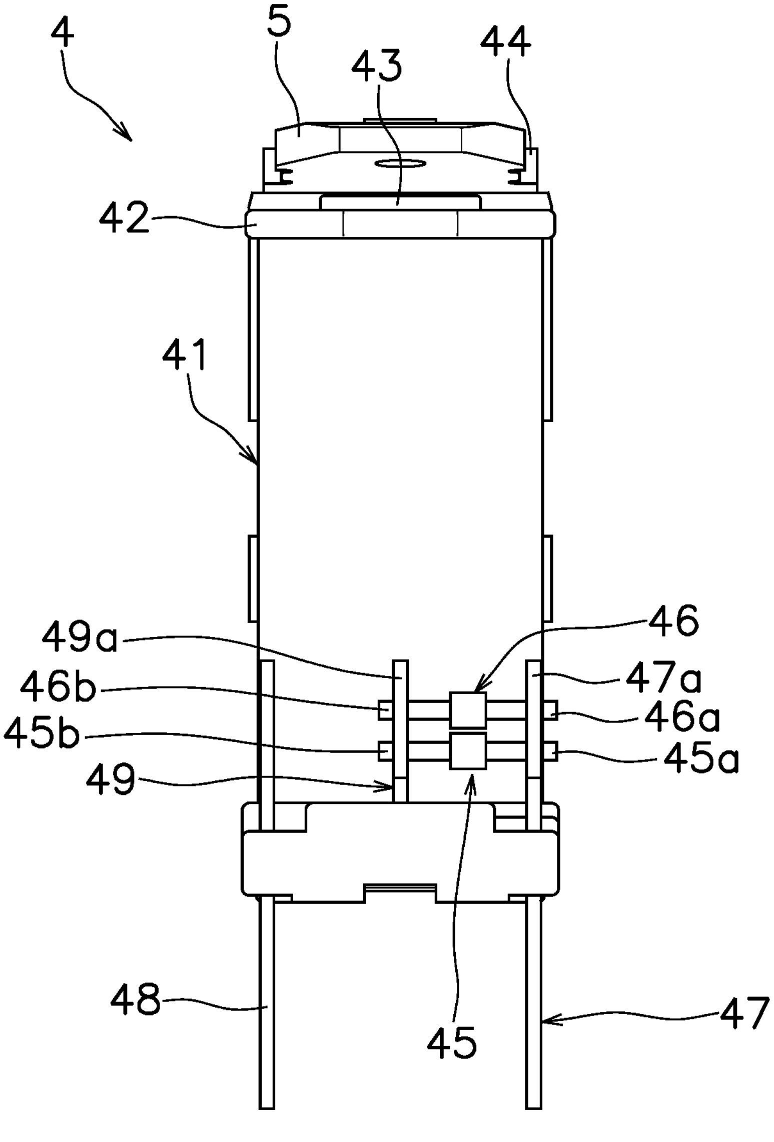
FIG. 4 is a rear view of an electromagnetic relay.

As shown in FIGS. 3 to 5, the electromagnet device 4 further includes a capacitor 45, a diode 46, a first coil terminal 47, a second coil terminal 48, and a third coil terminal 49.

The capacitor 45 is connected in series with the second coil 41*b*. The capacitor 45 is connected in parallel with the first coil 41*a*. The capacitor 45 has a capacitance of, for example, approximately 100 μF. The capacitor 45 is disposed between the second coil 41*b* and the first coil terminal 47. The capacitor 45 includes a first terminal 45*a* and a second terminal 45*b*. The first terminal 45*a* is connected to the first coil terminal 47. The second terminal 45*b* is connected to the third coil terminal 49.

The capacitor 45 is charged when a current flows through the capacitor 45 upon application of a voltage to the electromagnetic coil 41. After the elapse of a certain period of time after the current starts to flow through the capacitor 45, the capacitor 45 will be completely charged. Upon completion of the charging of the capacitor 45, the current flow through the second coil 41*b* will stop, and the second coil 41*b* will be changed from the conducting state to the non-conducting state.

The diode 46 is connected in parallel with the capacitor 45. The diode 46 is connected to the first coil terminal 47 and the third coil terminal 49. The diode 46 is arranged above the capacitor 45. The diode 46 functions as a protection circuit for protecting the electromagnet device 4 from reverse voltage.

The diode 46 includes a cathode terminal 46*a* and an anode terminal 46*b*. The cathode terminal 46*a* is connected to the first coil terminal 47. The cathode terminal 46*a* is separated from the first terminal 45*a* of the capacitor 45 in the up-down direction. The anode terminal 46*b* is connected to the third coil terminal 49. The anode terminal 46*b* is separated from the first terminal 45*a* of the capacitor 45 in the up-down direction.

The first coil terminal 47 extends through the base 2 in the up-down direction. The first coil terminal 47 is supported by at least one of the spool 42 and the base 2. The first coil terminal 47 is connected to the first coil 41*a*. The first coil terminal 47 is connected to the anode of the DC power supply 50.

The first coil terminal 47 includes a first receiving portion 47*a*. The first receiving portion 47*a* is at the top of the first coil terminal 47. The first receiving portion 47*a* is substantially U-shaped to receive the first terminal 45*a* of the capacitor 45 and the cathode terminal 46*a* of the diode 46. The first terminal 45*a* of the capacitor 45 and the cathode terminal 46*a* of the diode 46 are soldered to the first receiving portion 47*a*.

The second coil terminal 48 extends through the base 2 in the up-down direction. The second coil terminal 48 is supported by at least one of the spool 42 and the base 2. The second coil terminal 48 is connected to the first coil 41*a* and the second coil 41*b*. The second coil terminal 48 is connected to the cathode of the DC power supply 50.

The third coil terminal 49 is supported by at least one of the spool 42 and the base 2. The third coil terminal 49 is arranged to face the first coil terminal 47 in the left-right direction. The third coil terminal 49 may be arranged to face the first coil terminal 47 in the front-rear direction.

The third coil terminal 49 includes a second receiving portion 49*a*. The second receiving portion 49*a* is at the top of the third coil terminal 49. The second receiving portion 49*a* is substantially U-shaped to receive the second terminal 45*b* of the capacitor 45 and the anode terminal 46*b* of the diode 46. The second terminal 45*b* of the capacitor 45 and the anode terminal 46*b* of the diode 46 are soldered to the second receiving portion 49*a*.

Figure 6:
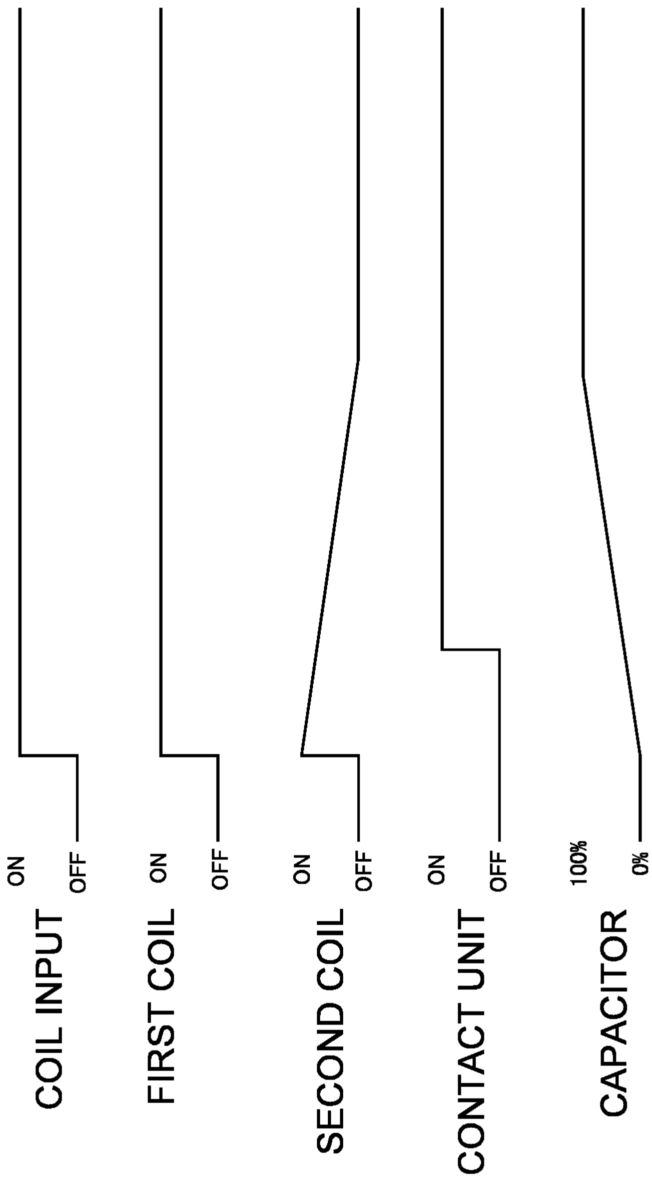
FIG. 6 is a timing chart illustrating the states of a first coil, a second coil, a contact device, and a capacitor when a voltage is applied to a magnetic coil.

FIG. 6 is a timing chart illustrating each of the states of the first coil 41*a*, the second coil 41*b*, the contact device 3, and the capacitor 45 when a voltage is applied to the electromagnetic coil 41.

With the application of the voltage to the electromagnetic coil 41, a current flows through the first coil 41*a* and the second coil 41*b*, and the first coil 41*a* and the second coil 41*b* are switched from the non-conducting state to the conducting state. As a result, an electromagnetic force acts on the movable iron piece 5, and the contact unit (the movable contact 10*a* and the fixed contact 8*a*) of the contact device 3 are switched from the OFF state to the ON state.

With the application of the voltage to the electromagnetic coil 41, the capacitor 45 is gradually charged over time. As the voltage in the capacitor 45 gradually increases, the current flowing through the second coil 41*b* decreases. After an elapse of a certain period after the voltage application starts, the capacitor 45 is completely charged. Upon completion of the charging of the capacitor 45, the current flow through the second coil 41*b* stops. As a result, the second coil 41*b* is switched from the conducting state to the non-conducting state. In contrast, the first coil 41*a* remains in the conducting state.

Here, in the electromagnetic coil 41, the ratio between the power consumption of the first coil 41*a* and the power consumption of the second coil 41*b* is set based on the holding voltage that is required to maintain the contact unit of the contact device 3 in the ON state. The power consumption of the first coil 41*a* is set such that the contact unit of the contact device 3 can be maintained in the ON state. When the holding voltage required to maintain the contact unit in the ON state is 25% of the operating voltage for turning the contact unit from the OFF state to the ON state, for example, the power consumption of the first coil 41*a* is set to 25%, and the power consumption of the second coil 41*b* is set to the remaining 75%. As a result, when the charging of the capacitor 45 is completed and the second coil 41*b* becomes non-conductive, the voltage applied to the electromagnetic coil 41 becomes the holding voltage. Note that the ratio between the power consumption of the first coil 41*a* and the power consumption of the second coil 41*b* is appropriately changed depending on the design of the electromagnetic relay 1.

The time required for the contact unit of the contact device 3 to switch from the OFF state to the ON state is shorter than the time required for the capacitor 45 to be completely charged. The time until the capacitor 45 to be completely charged is adjusted depending on the capacitance of the capacitor 45 and the power consumption of the second coil 41*b*. For example, the capacitance of the capacitor 45 is set such that the capacitor 45 becomes completely charged after the contact unit of the contact device 3 has switched from the OFF state to the ON state. As a result, after the contact unit of the contact device 3 has switched from the OFF state to the ON state by the application of the voltage to the electromagnetic coil 41, the second coil 41*b* will transition from the conducting state to the non-conducting state.

In the electromagnet device 4 of the electromagnetic relay 1 described above, the second coil 41*b* is connected in parallel to the first coil 41*a*, and when the capacitor 45 is completely charged by application of a voltage to the electromagnetic coil 41, the second coil 41*b* will have transitioned from the conducting state to the non-conductive state. That is, the first coil 41*a* and the second coil 41*b* are maintained in the conducting state from the time application of a voltage to the electromagnetic coil 41 starts until the capacitor 45 is completely charged. After the capacitor 45 is completely charged, the first coil 41*a* remains in the conducting state, and the second coil 41*b* will have become non-conducting due to the capacitor 45. As the second coil 41*b* becomes non-conductive, the voltage applied to the electromagnetic coil 41 changes to the holding voltage. As such, the voltage applied to the electromagnetic coil 41 changes from the operating voltage to the holding voltage with a simple configuration.

Note that when the voltage application to the electromagnetic coil 41 is stopped and the contact unit of the contact device 3 is switched from the OFF state to the ON state, discharge of the capacitor 45 may occur and take time for recovery. The direction of the current flowing through the first coil 41*a* due to the discharge of the capacitor 45, however, is opposite to the direction of the current flowing through the second coil 41*b* due to the discharge of the capacitor 45. Hence, by adjusting the number of each winding of the first coil 41*a* and the second coil 41*b*, the time for recovery can be decreased.

One embodiment of the electromagnetic relay according to one aspect of the present invention has been described above, but the present invention is not limited to the above embodiment, and various modifications are possible without departing from the gist of the invention.

The configurations of the contact device 3 and the electromagnet device 4 may be changed. For example, the present invention may be applied to a keep relay. Also, the present invention may be applied to an electromagnetic relay having a plurality of fixed terminals. For example, the present invention may be applied to a so-called C contact relay.

Figure 7:
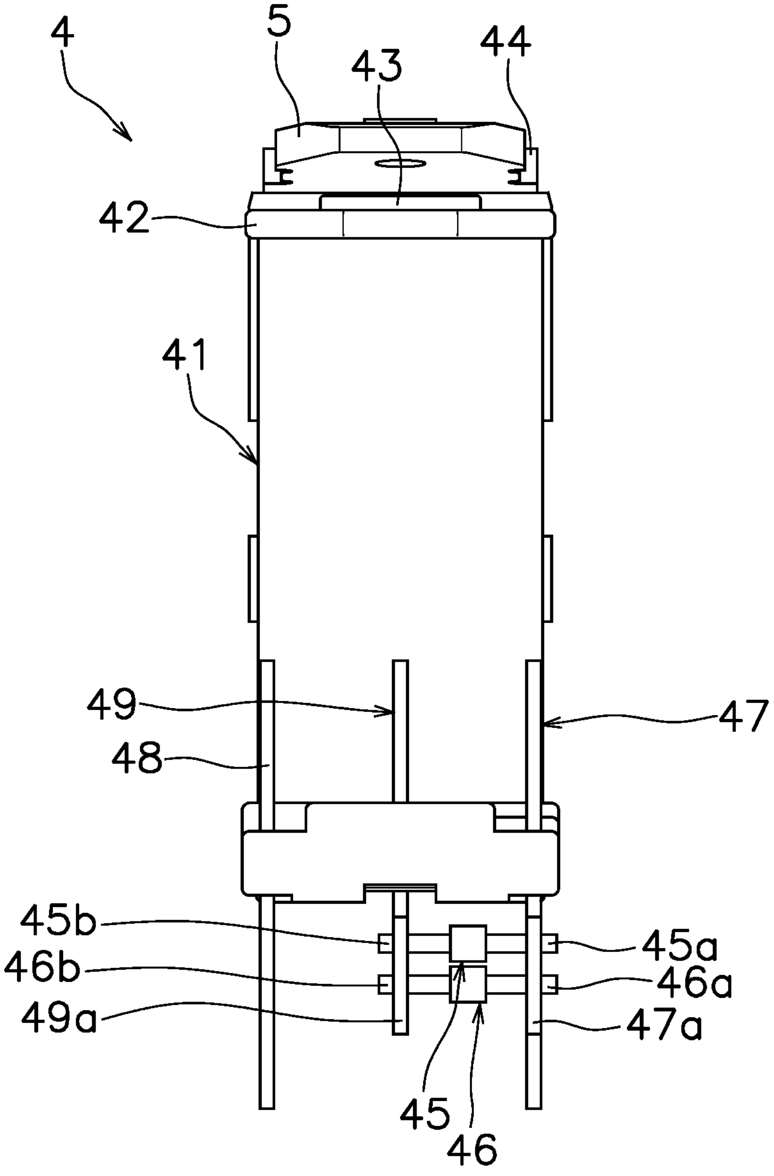
FIG. 7 is a diagram illustrating a modification of an electromagnet device.

The shapes of the first receiving portion 47*a* and the second receiving portion 49*a* may be changed. As shown in FIG. 7, the capacitor 45 and the diode 46 may be externally mounted to the first coil terminal 47 and the third coil terminal 49.

The configuration of the electromagnetic coil 41 may be changed. In the above embodiment, the electromagnetic coil 41 includes two coils: the first coil 41*a* and the second coil 41*b*, but the electromagnetic coil 41 may include, for example, three or more coils.

3 Contact device
4 Electromagnetic device
41 Electromagnetic coil
41*a* First coil
41*b* Second coil
45 Capacitor
45*a* First terminal
45*b* Second terminal
46 Diode
46*a* Cathode terminal
46*b* Anode terminal
47 First coil terminal
47*a* First receiving portion
48 Second coil terminal
49 Third coil terminal
49*a* Second receiving portion
50 DC power supply (Example of external power supply)

The invention claimed is:

1. An electromagnetic relay comprising:
a contact device; and
an electromagnet device configured to drive the contact device by electromagnetic force, the electromagnet device comprising,
an electromagnetic coil assembly including a first coil and a second coil connected in parallel to the first coil; and
a capacitor connected to the second coil and arranged to be charged by a voltage applied to the electromagnetic coil assembly, wherein
upon application of the voltage to the electromagnetic coil assembly, the first coil and the second coil are turned from a non-conducting state to a conducting state,
upon completion of a charging of the capacitor by the application of the voltage to the electromagnetic coil assembly, a current flow into the second coil ceases and the second coil will have changed from the conducting state into the non-conducting state, and
a power consumption of the first coil is lower than a power consumption of the second coil.

2. The electromagnetic relay according to claim 1, wherein a time required for a contact unit of the contact device to switch from an OFF state to an ON state by the application of the voltage to the electromagnetic coil assembly is shorter than a time required for the capacitor to be completely charged by application of the voltage.

3. The electromagnetic relay according to claim 1, wherein the capacitor is configured to be completely charged after a contact unit of the contact device has changed from an OFF state to an ON state by the application of the voltage to the electromagnetic coil.

4. The electromagnetic relay according to claim 1, further comprising
a first coil terminal including a first receiving portion, the first coil terminal connected to the first coil and an anode of an external power supply;
a second coil terminal connected to a cathode of the external power supply; and
a third coil terminal including a second receiving portion, wherein
the capacitor includes a first terminal inserted in the first receiving portion and a second terminal inserted in the second receiving portion.

5. The electromagnetic relay according to claim 4, further comprising a diode including a cathode terminal inserted in the first receiving portion and an anode terminal inserted in the second receiving portion.

6. The electromagnetic relay according to claim 5, wherein the capacitor and the diode are externally mounted to the first coil terminal and the third coil terminal.

7. The electromagnetic relay according to claim 1, further comprising,
a base on which the contact device is arranged and is supported, wherein
the contact device includes a fixed terminal and a movable contact piece both comprising a conductive material, and
a card configured to push the movable contact piece.

8. The electromagnetic relay according to claim 7, further comprising,
a movable iron piece disposed between the electromagnet device and the card, the movable iron piece being coupled to the card to move the card, a portion of the movable iron piece respectively moves to and away from the electromagnet device upon application and completion of the voltage to the electromagnetic coil assembly.

9. The electromagnetic relay according to claim 1, wherein the power consumption of the first coil is lower than a power consumption required to operate the contact device.

10. The electromagnetic relay according to claim 9, wherein the power consumption of the second coil is lower than the power consumption required to operate the contact device.

11. The electromagnetic relay according to claim 1, wherein the power consumption of the second coil is lower than a power consumption required to operate the contact device.

* * * * *